United States Patent [19]

Abuaf et al.

[11] Patent Number: 5,975,850

[45] Date of Patent: *Nov. 2, 1999

[54] TURBULATED COOLING PASSAGES FOR TURBINE BLADES

[75] Inventors: Nesim NMN Abuaf, Niskayuna; Steven Joseph Brzozowski, Scotia, both of N.Y.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/772,635

[22] Filed: Dec. 23, 1996

[51] Int. Cl.⁶ ........................................................ B63H 1/14
[52] U.S. Cl. .................................... 416/97 R; 415/115
[58] Field of Search .................................. 416/95, 96 R, 416/97 R, 96 A; 415/115, 178

[56] References Cited

U.S. PATENT DOCUMENTS

| | | |
|---|---|---|
| 3,171,631 | 3/1965 | Aspinwall ............................ 416/97 R |
| 4,278,400 | 7/1981 | Yamarik et al. ...................... 416/97 R |
| 4,347,037 | 8/1982 | Corrigan ............................... 416/97 A |
| 4,574,451 | 3/1986 | Smashey et al. ......................... 29/423 |
| 5,352,091 | 10/1994 | Sylvestro .............................. 416/96 A |
| 5,387,086 | 2/1995 | Frey et al. . |
| 5,468,125 | 11/1995 | Okpara et al. ........................ 416/97 R |
| 5,586,866 | 12/1996 | Wettstein .............................. 416/96 A |
| 5,653,110 | 8/1997 | Lee et al. .................................. 416/95 |

*Primary Examiner*—Thomas E. Denion
*Attorney, Agent, or Firm*—Patrick K. Patnode; Marvin Snyder

[57] ABSTRACT

A turbine blade including an airfoil section having contoured surface geometries between the consecutive ribs or turbulators on the leading edge passage walls is described. The contoured surface geometries increase the overall heat transfer surface area between adjacent ribs as compared to the heat transfer surface area of a smooth inter-rib wall. The contoured surface geometries do not, however, change the overall serpentine passage geometry or the large scale flow characteristics of the turbulated cooling passageways. The contoured surface geometries may have many different geometries (e.g., triangular, conical, semi-cylindrical, cylindrical columns or indentations in the side wall such as semi-circular dimples).

3 Claims, 3 Drawing Sheets

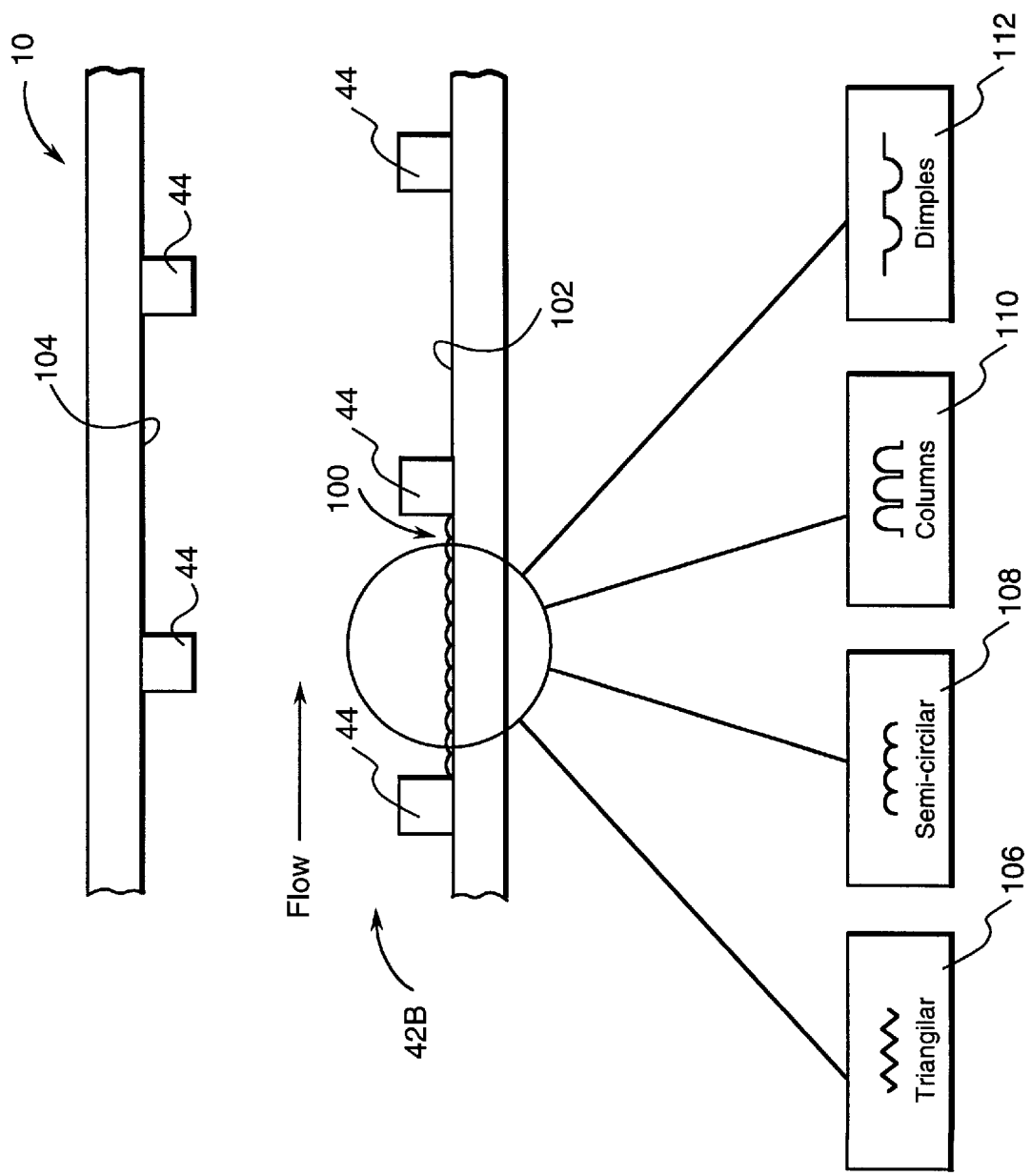

TURBULATED COOLING PASSAGES FOR TURBINE BLADES

BACKGROUND OF THE INVENTION

This invention relates generally to turbine blades and, more particularly, to blade structures with improved cooling.

Turbine blades employed in gas turbines include a leading edge and a trailing edge. The leading edge is the blade surface that is first contacted by the working medium gases in the turbo-machine. The trailing edge is the blade surface that is last contacted by the working medium gases as the gases pass by the blade.

The temperatures within gas turbines may exceed 2500 degrees Fahrenheit, and cooling of turbine blades is very important in terms of blade longevity. Without cooling, turbine blades would rapidly deteriorate. Improved cooling for turbine blades is very desirable, and much effort has been devoted by those skilled in the blade cooling arts to devise improved geometries for the internal cavities within turbine blades in order to enhance cooling.

With respect to blade cooling, some known turbine blades have internal cavities forming a serpentine cooling circuit. Turbulators, sometimes referred to as ribs, are cast on the suction and pressure side passage walls of the serpentine cooling circuit. The ribs are usually cast with a rib height to passage hydraulic diameter ratio of 0.1 to 0.2 and are positioned perpendicular, or at an angle, to the cooling medium flow. The cooling media usually is fed at the root section of the blade and exits either through blade tip and trailing edge openings, or through film holes located between two adjacent turbulators. In a closed circuit cooling system, the cooling media is returned to the root exit region of the blade.

The walls defining the serpentine cooling circuit are smooth and do not provide high cooling rates, i.e., high heat transfer coefficients. The ribs, however, enhance the coolant side heat transfer. Particularly, the ribs break the hot thermal boundary layers near the side walls, thus causing separation and reattachment regions which cause strong mixing between the hot coolant near the walls and the relatively lower temperature coolant flowing in the center portion of the passage.

Although the above described ribs provide improved cooling, it would be desirable to provide even better blade cooling. In providing even better blade cooling, it also would be desirable to avoid significantly increasing blade fabrication costs.

SUMMARY OF THE INVENTION

In accordance with the instant invention, a turbine blade comprises an airfoil section having contoured surface geometries between consecutive turbulators (ribs) on the leading edge or any other passage walls. The contoured surface geometries increases the overall heat transfer surface area between adjacent ribs as compared to the heat transfer surface area of a smooth inter-rib wall. The contoured surface geometries do not, however, change the overall serpentine passage geometry or the large scale flow characteristics of the turbulated cooling passageways. The contoured surface geometries may have many different geometries (e.g., triangular, conical, semi-cylindrical, cylindrical columns or indentations in the side wall such as semi-circular dimples).

More particularly, the contoured surface geometries may be located between adjacent ribs on the leading edge wall of the airflow passageway in the airfoil section. The height and width of the contoured surface geometries preferably are small as compared to the rib height or pitch characteristic lengths. As described hereinafter in more detail, the selected contoured surface geometry depends on the area enhancement value desired. In addition, the contoured surface geometries can be shaped as discrete elements or as continuous longitudinal ribs. The pattern direction of the longitudinal contoured surface geometries could be parallel to the cooling medium flow, perpendicular to such flow, or at any other specific angle to cooling medium flow. The pattern direction of the contoured surface geometries preferably would be optimized with respect to the direction of the local flow streamlines to provide the highest heat transfer surface enhancement possible.

Although the tooling required to form the contoured surface geometries may be somewhat more expensive to machine and maintain than existing blade tooling, the fabrication time and blade material required is not believed to be significantly affected. It also is believed that the increased tooling costs associated with fabrication of the contoured surface geometries is more than offset by the improved cooling, and extended blade life, provided by the contoured surface geometries.

BRIEF DESCRIPTION OF THE DRAWINGS

FIG. 3 is an enlarged view of a portion of a blade surface including alternative contoured surface geometry configurations in accordance with the present invention.

DETAILED DESCRIPTION OF THE DRAWINGS

Figure 1:
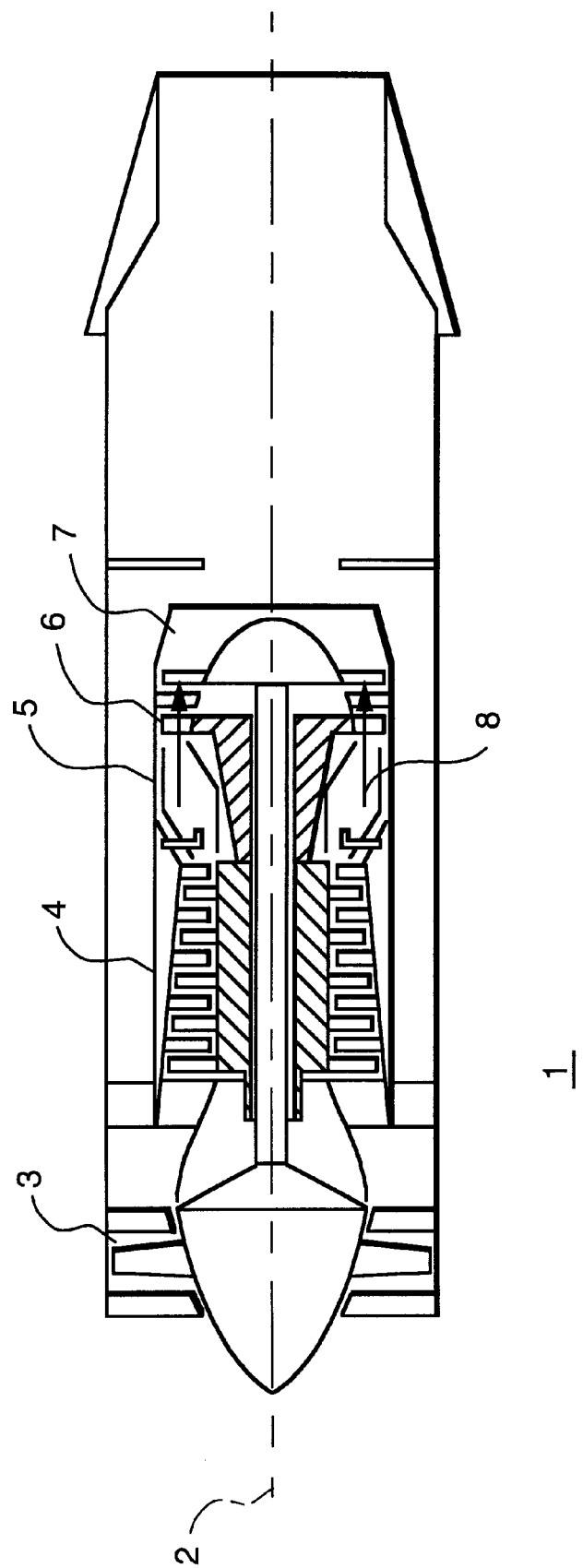
FIG. 1 is a cross-sectional plan view of a turbine engine in accordance with the present invention.

A turbine engine 1, such as a gas turbine used for power generation or propulsion, circumferentially disposed about an engine centerline 2 and having in serial flow relationship a fan section 3, a high pressure compressor 4, a combustion section 5, a high pressure turbine 6, and a low pressure turbine 7, is shown in FIG. 1. In operation, the high pressure compressor 6 draws in fresh air and compresses the air. The air is admitted into the combustion chamber of combustion section 5. In combustion section 5, fuel is burned producing a very hot gas flow, (represented by arrow 8 of FIG. 1), with a temperature frequently greater than about 2500° F. The gas flow is directed at a high velocity into turbine sections 6, 7, which turbine sections 6, 7 in turn harness the energy of the gas flow to drive turbine sections 6, 7 about respective axes of rotation. The use of a system having a high pressure compressor and a low pressure compressor is for illustrative purposes only and is not a limitation of the instant invention.

Figure 2:
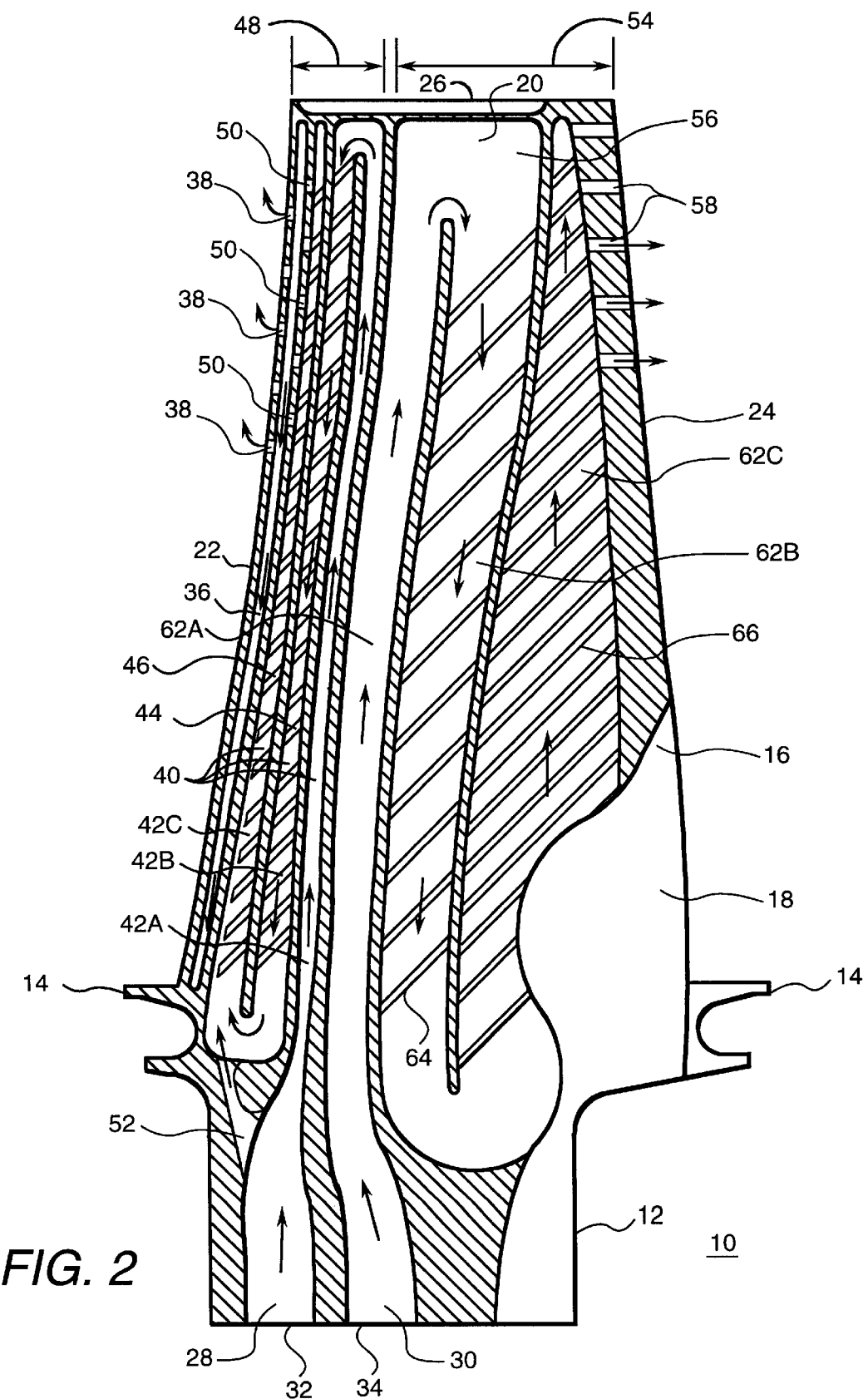
FIG. 2 is a simplified side view of a turbine blade including a cut-away portion which depicts known inner cooling mechanisms.

FIG. 2 is a simplified side view of a turbine blade 10 in which most of the surface of the blade has been cut away to reveal the cooling structures. Although the present invention is described herein in connection with blade 10, the present invention is not limited to practice in blade 10. The present invention can be implemented and utilized in connection with many other blade configurations. Therefore, it should be understood that blade 10 is merely an exemplary blade in which the present invention can be implemented and utilized.

Blade 10 includes a dovetail section 12, a platform section 14 and an airfoil section 16. Dovetail section 12 is adapted for attachment to the rotor of a turbine shaft (not shown) or other turbine blade receiving structure in a gas turbine. Platform section 14 forms the portion of the inner wall of the working medium flow path in a turbine.

Airfoil section 16 extends outwardly into the working medium flow path of the turbine where working medium gases can exert motive forces on the surfaces thereof. Airfoil section 16 includes a pressure side wall 18 and a suction side wall 20 which are joined together at leading edge 22 and trailing edge 24. Blade 10 includes a tip 26. For purposes of this document, the inward direction is defined as the direction toward dovetail section 12 and the outward direction is defined as the direction toward tip 26.

A leading edge conduit 28 and a trailing edge conduit 30 provide supplies of pressurized cooling medium to blade 10. A cooling medium inlet port 32, or opening, is situated at the lowermost end of leading edge conduit 28. A cooling medium inlet port 34, or opening, is situated at the lowermost end of trailing edge conduit 30. Blade 10 includes a leading edge cavity 36 having a plurality of film holes 38. Blade 10 also includes an inner cavity 40 which is coupled to leading edge conduit 28. Inner cavity 40 is a three pass serpentine which includes a passageway 42A, a passageway 42B and a passageway 42C. Cooling medium flows outwardly from leading edge conduit 28 and along passageway 42A, and then turns inwardly into passageway 42B along which a plurality of turbulence promoters 44, sometimes referred to herein as turbulators or ribs, are situated. Such turbulators 44 increase the effective heat transfer efficiency. The cooling medium then turns outwardly into passageway 42C along which turbulence promoters 46 increase the effective heat transfer efficiency. As cooling medium flows along passageways 42A, 42B, and 42C, it convectively cools the portions of turbine blade 10 adjacent these passageways throughout leading edge flow region 48.

As the pressurized cooling medium passes into passageway 42C of inner cavity 40, it flows through connecting holes or impingement holes 50 which couple inner cavity 40 to leading edge cavity 36. Leading edge cavity 36 is thus pressurized and cooling medium flows out film cooling holes 38 to create a cooling medium film on the exterior of leading edge 22. In this manner, the exterior of leading edge 22 is film-cooled.

Blade 10 also includes a refresher cooling medium passageway 52 which directly couples cooling medium from conduit 28 to passageway 42C, which is the passageway of inner cavity 40 closest to leading edge cavity 36. Refresher passageway 52 is situated adjacent platform section 14 and dovetail section 12, as shown. In this manner, the cooling medium which has passed through passageways 42A and 42B, and which has become warmed, is refreshed with relatively cooler cooling medium. This use of cooling medium through passageways 42A and 42B provides sufficient pressure in passageway 42C to prevent backflow problems and enhances cooling in the leading edge of blade 10. Leading edge cavity 36, serpentine inner cavity 40 and refresher passageway 52 together form an advanced type of modified warm bridge cooling circuit for the leading edge flow region 48 of blade 10 in which backflow problems are substantially reduced.

To cool the trailing edge flow region 54 of blade 10, trailing edge flow region 54 is provided with a trailing edge cavity 56 having a plurality of cooling medium exit slots 58 at trailing edge 24. Trailing edge cavity 56 is coupled to trailing edge cooling medium conduit 30 such that cavity 56 is supplied with cooling medium. As seen in FIG. 1, trailing edge cavity 56 is isolated from inner cavity 40 by an inner wall 60 therebetween. Trailing edge cavity 56 includes serpentine passageways 62A, 62B and 62C. More particularly, passageway 62A is coupled to trailing edge cooling medium conduit 30 such that pressurized cooling medium passes outwardly through passageway 62A and then turns inwardly into passageway 62B. Passageway 62B includes a plurality of turbulence promoters 64 along its path. After passing through passageway 62B, the cooling medium turns and passes outwardly through passageway 62C which includes a plurality of turbulence promoters 66 along its path. After cooling the trailing edge flow region 54 along passageways 62A, 62B and 62C, the cooling medium exits through exit slots 58. Further details regarding blade design, as discussed herein, are set forth in commonly assigned U.S. Pat. No. 5,387,086, which is hereby incorporated by reference.

Although adequate blade cooling is achieved in blade 10, it would be desirable to provide even better cooling to even further extend blade life. Of course, such enhanced blade cooling preferably would be provided without significantly increasing the blade material and fabrication costs.

These objectives are believed to be achieved by various embodiments of the present invention which, in one form, includes contoured surface geometries between the consecutive ribs or turbulators on the leading edge or any other passage walls, e.g., between ribs 44 and 46 of passageways 42B and 42C of blade 10. The additional contoured surface geometries increase the overall heat transfer surface area between adjacent ribs as compared to the heat transfer surface area of a smooth inter-rib wall. The contoured surface geometries do not, however, change the overall serpentine passage geometry or the large scale flow characteristics of the turbulated cooling passageways. The contoured surface geometries may have many different geometries (e.g., triangular, conical, semi-cylindrical, cylindrical columns or indentations in the side wall such as semi-circular dimples).

In accordance with an exemplary embodiment of the instant invention, an enlarged, cross-sectional view of a portion of passageway 42B including ribs 44 of blade 10 is illustrated in FIG. 3. Contoured surface geometries, generally indicated at 100, are located between adjacent ribs 44 on leading edge wall 102 of passageway 42B. Although not illustrated, it should be understood that contoured surface geometries 100 typically are located between each adjacent pair of ribs 44 on wall 102. There are no contoured surface geometries, in the illustrated embodiment, on trailing edge wall 104 of passageway 42B. Contoured surface geometries 100 could similarly be located on the leading edge walls between adjacent ribs 46 (passageway 42C), ribs 64 (passageway 62B), and ribs 66 (passageway 62C).

Contoured surface geometries 100 can have many alternative geometric configurations. Exemplary contoured surface geometry configurations are illustrated in FIG. 3. Specifically, contoured surface geometries 100 could have triangular 106 or semi-circular 108 geometric shapes.

Alternatively, contoured surface geometries 100 could be columns 110 or dimples 112.

The height and width of contoured surface geometries 100 preferably are small as compared to the turbulator height or pitch characteristic lengths. For example, for a land based power turbine, the rib heights may be in the range of about 0.060 inches to about 0.1 inches, depending on the passage hydraulic diameter and the rib height to passage diameter ratio. Contoured surface geometries 100 will have typical characteristic heights in the range of about 0.005 inches to about 0.010 inches. The selected contoured surface geometry depends on the area enhancement value desired. For example, for a fin effectiveness value of one, triangular surface geometries 106 with a ninety degree apex angle will provide a heat transfer surface enhancement of about 1.4, and a sixty degree apex angle will increase this enhancement to about 2. Semi-circular surface geometries 108 will provide a heat transfer surface enhancement of about 1.57, and cylindrical column surface geometries 110 can provide heat transfer surface enhancement of about 2.0 depending on the column radius and height. Wall indentation, or dimple, surface geometries 112 preferably would be optimized for the specific application. Contoured surface geometries 100 can be shaped as discrete elements or as continuous longitudinal ribs. The pattern of longitudinal contoured surface geometries 100 could be parallel to the cooling medium flow, perpendicular to such flow, or at any other specific angle to cooling medium flow. The pattern of contoured surface geometries 100 preferably would be optimized with respect to the direction of the local flow streamlines to provide the highest heat transfer surface enhancement possible.

With respect to fabrication of contoured surface geometries 100, machine elements corresponding to such contoured surface geometries 100 can be machined in the molds, or dies, used in fabricating the blade. During blade fabrication, the blade is simply cast in the dies and contoured surface geometries 100 are formed integral with the blade. Therefore, although the tooling required to form contoured surface geometries 100 may be somewhat more expensive to machine and maintain than existing tooling, the fabrication time and blade material required is not believed to be significantly affected. It is believed that increased tooling costs associated with contoured surface geometries 100 is more than offset by the improved cooling, and extended blade life, provided by contoured surface geometries 100.

As described above, the present invention can be implemented and utilized in connection with many alternative blade configurations. In addition, the present invention can be utilized in turbine blades of turbine generators as well as turbine engines, e.g., in aircraft and marine applications, or the like.

From the preceding description of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A turbine blade comprising:

a base section having at least one cooling conduit;

an airfoil section comprising a pressure side wall and a suction side wall;

a cooling passageway located within said airfoil section for permitting airflow from said base section cooling conduit into and through said airfoil section;

a plurality of spaced ribs extending into said cooling passageway from an inner wall of said airfoil section; and a plurality of discrete conically-shaped contoured surface geometries integral with said inner wall and located between at least one pair of said spaced ribs;

wherein said ribs extend approximately about 0.060 to 0.1 inches into said passageway and said contoured surface geometries extend in the range of about 0.005 inches to about 0.010 inches into said passageway.

2. A turbine blade comprising:

a base section having at least one cooling conduit;

an airfoil section comprising a pressure side wall and a suction side wall;

a cooling passageway located within said airfoil section for permitting airflow from said base section cooling conduit into and through said airfoil section;

a plurality of spaced ribs extending into said cooling passageway from an inner wall of said airfoil section; and a plurality of discrete cylindrical column-shaped contoured surface geometries integral with said inner wall and located between at least one pair of said spaced ribs;

wherein said ribs extend approximately about 0.060 to 0.1 inches into said passageway and said contoured surface geometries extend in the range of about 0.005 inches to about 0.010 inches into said passageway.

3. A turbine blade comprising:

a base section having at least one cooling conduit;

an airfoil section comprising a pressure side wall and a suction side wall;

a cooling passageway located within said airfoil section for permitting airflow from said base section cooling conduit into and through said airfoil section;

a plurality of spaced ribs extending into said cooling passageway from an inner wall of said airfoil section; and a plurality of discrete semi-circular-shaped contoured surface geometries integral with said inner wall and located between at least one pair of said spaced ribs;

wherein said ribs extend approximately about 0.060 to 0.1 inches into said passageway and said contoured surface geometries extend in the range of about 0.005 inches to about 0.010 inches into said passageway.

\* \* \* \* \*